J. J. SEELMAN.
CONTAINER FOR FLUIDS FOR INJECTION PURPOSES.
APPLICATION FILED MAR. 10, 1920.

1,424,187.                                            Patented Aug. 1, 1922.

WITNESSES

INVENTOR
ATTORNEY.

UNITED STATES PATENT OFFICE.

JOHN J. SEELMAN, OF MILWAUKEE, WISCONSIN.

CONTAINER FOR FLUIDS FOR INJECTION PURPOSES.

1,424,187. Specification of Letters Patent. Patented Aug. 1, 1922.

Application filed March 10, 1920. Serial No. 364,861.

*To all whom it may concern:*

Be it known that I, JOHN J. SEELMAN, a citizen of the United States, and resident of Milwaukee, in the county of Milwaukee and State of Wisconsin, have invented new and useful Improvements in Containers for Fluids for Injection Purposes, of which the following is a description, reference being had to the accompanying drawings, which are a part of this specification.

The invention relates to containers for fluids or semi-fluids for use for injection purposes into human or animal bodies whereby contamination of the fluid within the container is prevented during the withdrawal of a portion of the fluid.

With the usual form of container for fluids or semi-fluids which are injected subcutaneously, intravenously or intramuscularly into animal tissue with a hypodermic syringe the fluid which is withdrawn from the container is replaced by atmospheric air which, as is well known, contains mold spores and disease bacteria that will necessarily effect the remaining fluid in the container, rendering it unfit for use for subsequent injections. To obviate these difficulties I have provided a container in which means are provided for allowing purified or filtered air to take the place of the fluid withdrawn from the container by means of the syringe so that the remaining contents of the container will not be contaminated and may be safely used for subsequent injections.

The invention further consists in the several features hereinafter set forth and more particularly defined by claims at the conclusion hereof.

Figure 1:
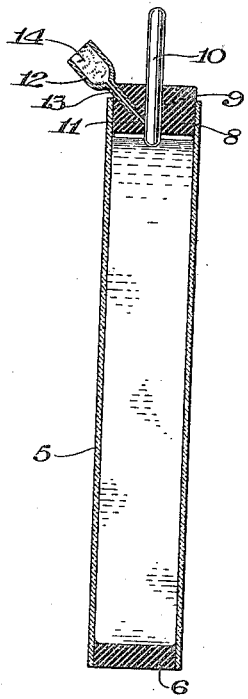
Figure 2:
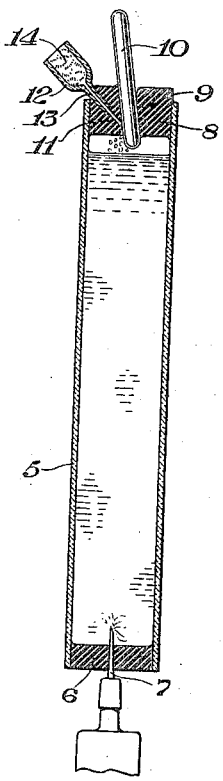

In the drawings Fig. 1 is a vertical sectional view through a container embodying the invention showing it in a sealed condition; Fig. 2 is a view similar to Fig. 1 showing the container while fluid is being withdrawn therefrom.

Referring to Figures 1 and 2 the container consists of a glass tube 5 provided with a bottom 6 which, in the present instance, is made of rubber in the form of what is called a "rubber dam", so that the same seals itself after it has been pierced by the hypodermic needle 7 which is inserted therethrough for withdrawing the fluid from the container. The container also is provided with a rubber stopper 8 at its other end having a central opening 9 therein receiving a glass or metal stopper or plug 10. An inclined duct 11 communicates with the opening 9 at a short distance above the inner face of the stopper and a tubular funnel 12, preferably of glass, has a reduced portion 13 communicating with the duct 11, said funnel containing a suitable amount of absorbent cotton 14. This cotton may be treated with a liquid antiseptic if desired. With this construction to withdraw the fluid from the container the needle 7 is projected through the rubber dam 6, as shown in Fig. 2, and the plug 10 is then inclined or canted in the stopper 8 so as to establish a communication between the lower portion of the opening 9 and the duct 11 so that air which passes through the funnel 12 containing the cotton, and is thereby sterilized, may pass from the duct 11 into the end of the container to take the place of the liquid which has been withdrawn from the other end of the container. This introduction of the air equalizes the pressure within the tube so that the fluid may be readily taken up by the syringe and prevents any contamination of the remainder of the fluid in the container due to the fact that the air has been relieved of any dangerous foreign matter, such as bacteria and germs, during its passage through the cotton. With the withdrawal of the needle of the syringe the rubber dam seals itself and at the same time the stopper 10 is released from is inclined position so that the tube is again sealed and the contents thereof are properly preserved so that subsequent injections may be removed therefrom without danger of contamination.

I desire it to be understood that this invention is not limited to any specific form or arrangement of parts except in so far as such limitations are specified in the claims.

What I claim as new and desire to secure by Letters Patent is:

1. In a container of the class described, the combination with a tube, of a self-sealing rubber dam at one end of the tube, and a stopper at the other end of the tube, said stopper being provided with means for introducing purified air into the interior of the tube while fluid is withdrawn therefrom.

2. In a container of the class described, the combination with a tube, of a self-sealing rubber dam at one end of the tube and a rubber stopper at the other end of the tube, said stopper being provided with a passage communicating with the interior of the tube, means for filtering air as it passes to said passage, and means for controlling the passage of air to the interior of the tube.

In testimony whereof, I affix my signature.

JOHN J. SEELMAN.